Feb. 8, 1966  S. A. SCHERBATSKOY  3,234,382
GAMMA RAY MEASURING SYSTEM UTILIZING PLURAL DETECTORS
Filed Dec. 24, 1962  7 Sheets-Sheet 1
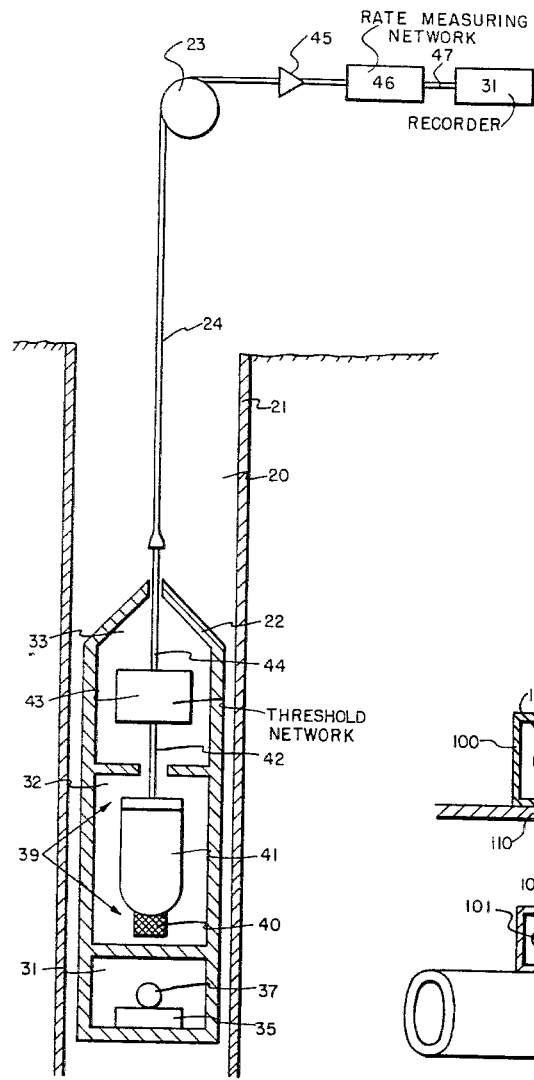
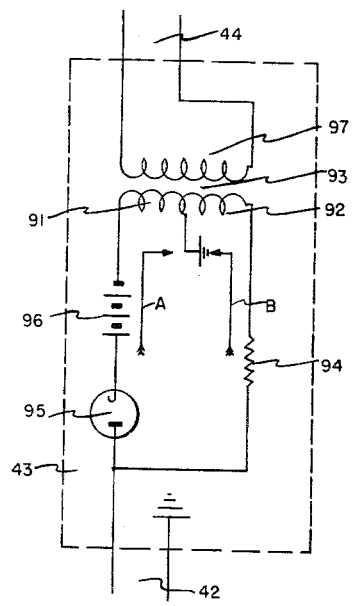
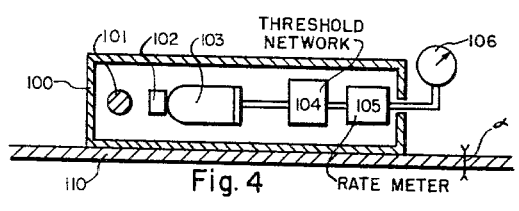
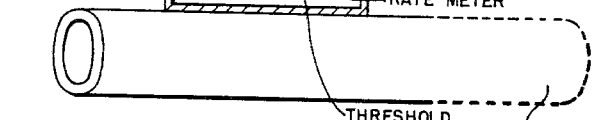
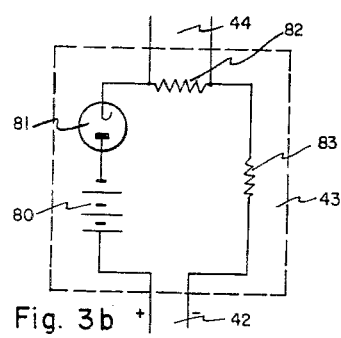
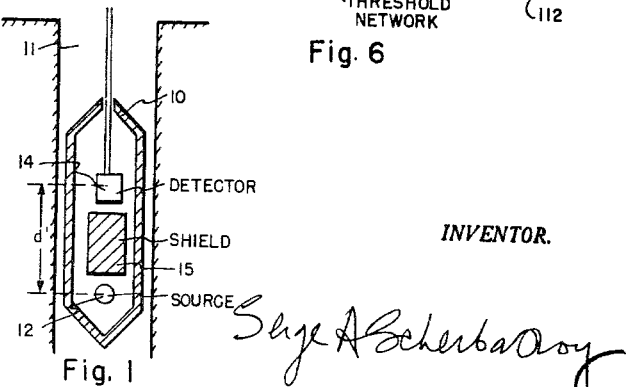
INVENTOR.
Serge A Scherbatskoy Feb. 8, 1966     S. A. SCHERBATSKOY     3,234,382
GAMMA RAY MEASURING SYSTEM UTILIZING PLURAL DETECTORS
Filed Dec. 24, 1962     7 Sheets-Sheet 2

INVENTOR.

INVENTOR.
Serge A. Scherbatskoy

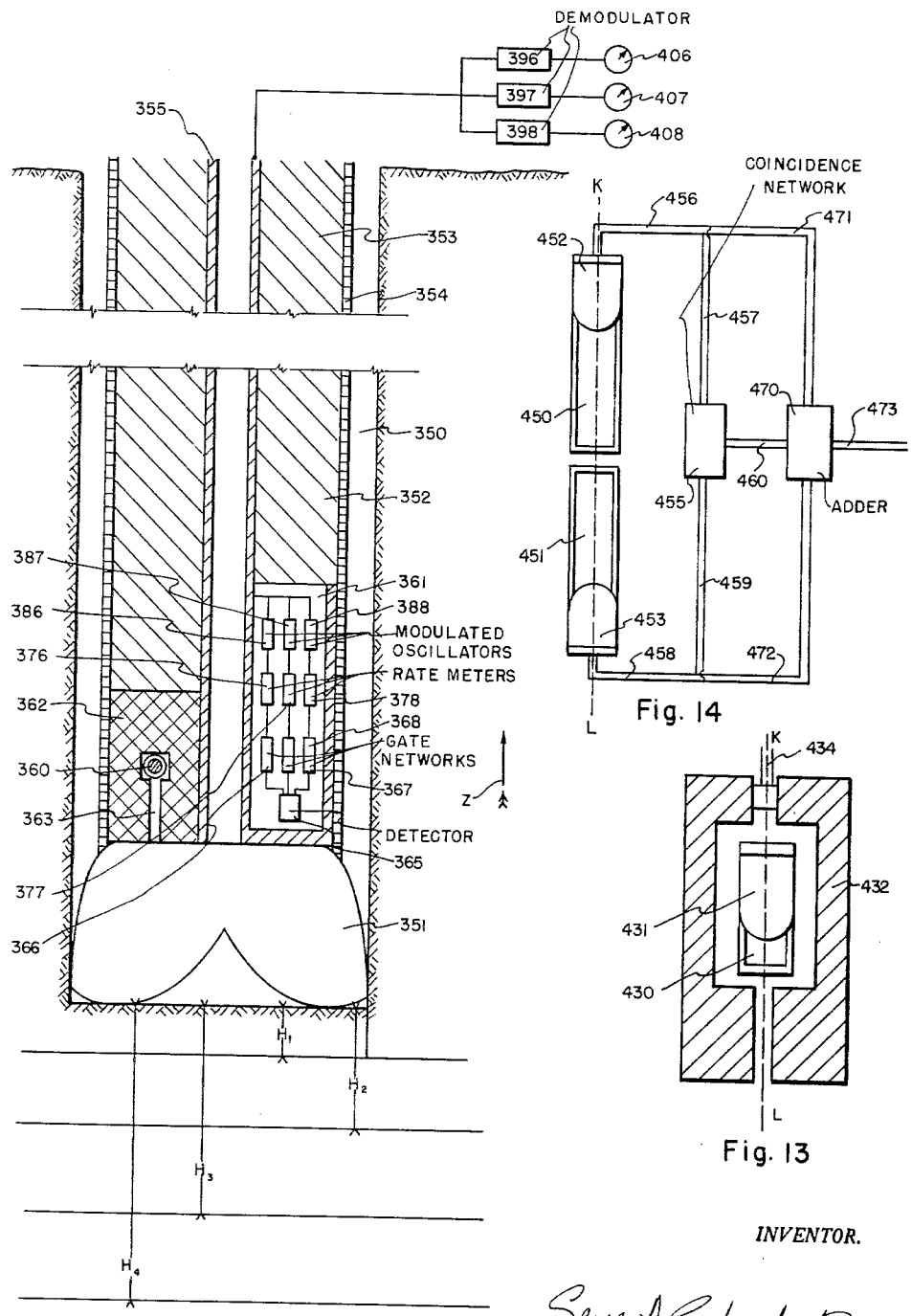

United States Patent Office 3,234,382
Patented Feb. 8, 1966

3,234,382
GAMMA RAY MEASURING SYSTEM UTILIZING PLURAL DETECTORS
Serge A. Scherbatskoy, 804 Wright Bldg., Tulsa 3, Okla.
Filed Dec. 24, 1962, Ser. No. 247,480
5 Claims. (Cl. 250—71.5)

This application is a continuation-in-part of the U.S. application Serial No. 832,971, now U.S. Patent No. 3,071,689, filed by Serge A. Scherbatskoy on Aug. 11, 1959, for an improvement in nuclear measuring system.

This invention is concerned with an apparatus for performing measurements of radiations resulting from nuclear transformations within an unknown substance, the characteristics of which it is desired to determine. The nuclear transformations can be caused by an external agent such as a neutron source placed adjacent to the substance and in the neighborhood of a suitable detecting instrument.

Various specific objects of my invention and the details of its operation will be specifically described in connection with the accompanying drawings in which:

FIG. 1 shows schematically a device for performing measurements in a bore hole in the earth as practiced in the prior art.

FIG. 2 shows schematically the application of my measuring system for operation in a bore hole.

FIG. 3a shows a threshold network for transmitting impulses below a determined threshold value.

FIG. 3b shows a threshold network for transmitting impulses above a determined threshold value.

FIG. 4 shows the application of the principles of my invention for determining the thickness of a plate.

FIG. 6 shows the application of the principle of my invention for determining the density of fluid within a pipe line.

FIG. 12 shows an arrangement comprising a directional detector in combination with a gate network for logging the formations while drilling.

FIG. 13 shows a directional detector to be used in the arrangement of FIG. 12.

FIG. 14 shows another type of a directional detector to be used in the arrangement of FIG. 12.

Figure 9:
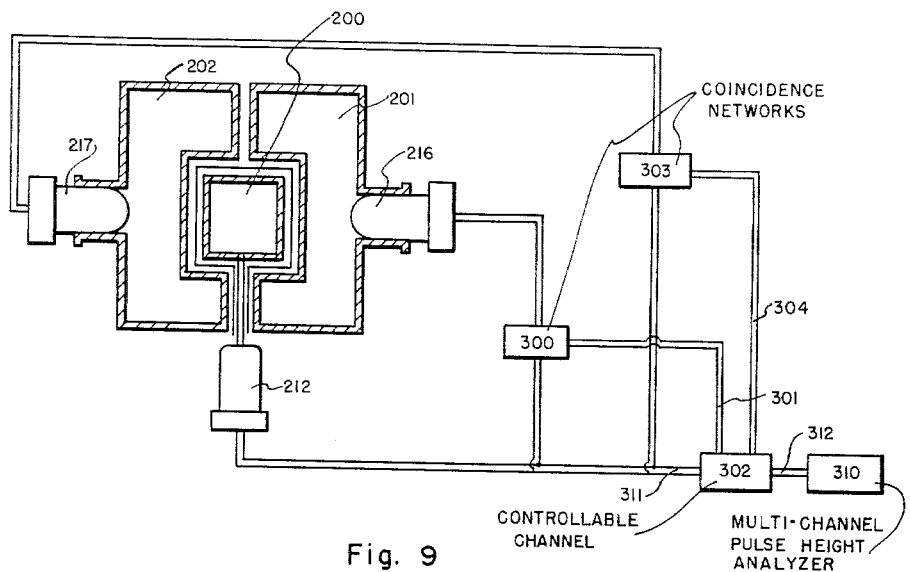
FIG. 9 shows a modification of the arrangement shown in FIG. 7.

Referring now particularly to FIG. 1, numeral 10 designates an exploring housing which is adapted to be lowered by means of a cable to various depths in the bore hole 11 in order to perform measurements of the formations adjacent said hole. The exploring housing contains essentially three elements: (1) A source of radiation 12 such as a source of neutrons or gamma rays that are radiated into the adjacent formation; (2) a detector 14 for detecting the radiations scattered or reflected by the formation; and (3) a shield 15 interposed between the source and the detector. The purpose of the shield is to attenuate any radiation that could follow the direct path from the source 12 to the detector 14. Thus the shield 15 is an essential element of the arrangement of the prior art since the presence of this shield makes it possible for the detector 14 to respond predominantly to the radiations reflected or scattered by the adjoining formation and to be insensitive to any direct radiations from the source 12. Therefore, because of the shield 15, the output of the detector 14 can be used as an index of the properties of the adjoining formation. It is apparent that if the shield were not present, the direct radiations from the source to the detector would be intense, and any useful effect due to the radiations scattered and reflected by the adjoining formation would be completely lost and masked by the effect of the source.

In the prior art the presence of the shield introduced a certain inflexibility in the design of the subsurface exploring instrument; namely, the source 12 could not be placed arbitrarily with respect to the detector 14, since there had to be a certain minimum distance $d'$ between the detector and the source that was sufficient for the insertion of the shield 15.

In many instances, however, it is desirable, particularly in logging relatively thin formations, to place the radiation source adjacently to the detector. This can be accomplished in accordance with my present invention by eliminating entirely the shield and utilizing as detector a proportional counter, that is adapted to produce impulses that are proportional to the energy of the intercepted radiation particles or quanta. It is well known that the radiation that follows the direct path from the source to the detector is different in energy (and in some instances in character) from the radiation that is scattered by or induced in the formation. Accordingly, I provide across the output terminals of the proportional counter a pulse height analyzer that selectively transmits only the impulses within an energy range corresponding to radiation scattered or induced in the formation and selectively attenuates the impulses within an energy range corresponding to the radiation that is directly transmitted from the source to the detector. It is thus apparent that such a pulse height analyzer makes a shield unnecessary and makes it possible to place the source of radiation in any desired position with respect to the detector.

Referring now to FIG. 2, there is schematically illustrated a drill hole 20 penetrating the formations to be explored. The drill hole is provided in conventional manner with a tubular metallic casing designated 21. For the purpose of exploring the formations along the bore hole there is provided in accordance with the present invention exploration apparatus comprising a housing 22 which is lowered into the bore hole 21 by means of a cable 24. The cable 24 has a length somewhat in excess of the depth of the bore hole to be explored and is normally wound on a drum to lower the exploring apparatus into the bore hole 20 and may be rewound upon the drum to raise the exploring apparatus.

In order to determine the depth of the exploratory apparatus within the bore hole, measuring wheel 23 is provided which measures the depth in a conventional manner.

The housing of the exploratory apparatus is divided into three sections designated by numerals 31, 32, and 33, respectively. In the section 31 there is provided a solid support 35 on which is disposed a suitable source of radiation 37 to be described hereafter.

The section 32 comprises a scintillation counter 39 consisting of a crystal 40 and a photomultiplier 41.

The crystal 40 may be of anthracene, sodium iodide, or sodium tungstate or of any other substance adapted to produce light as a result of interaction with incident photons. As it is well known, an incident photon interacting with the crystal undergoes multiple scattering and contributes a portion of its energy to Compton scattering at each scattering point. It is desirable for the incident photon to be completely absorbed by the crystal, since only then will the amount of light produced in the crystal be proportional to the photon's energy. The complete absorption of the gamma ray within the crystal can be accomplished by selecting a sufficiently large crystal. The light produced in the crystal as a result of interaction with the gamma ray subsequently impinges upon a photomultiplier 41 to produce a current impulse proportional to the energy of the intercepted gamma ray.

The output of the photomultiplier 41 is in turn applied to the input terminals 42 of a threshold network designated schematically by block 43 and located in the compartment 33. The output of the threshold network is in turn connected with the cable 24. An amplifier 45 is connected to the surface end of the cable 24. The output of the amplifier is connected to the rate measuring network 46 which is of conventional type and is adapted to produce across its output terminals 47 a D.C. voltage having a magnitude representing the frequency of occurrence of the impulses applied to its input. The output of the rate measuring network is connected to the recorder 31.

To illustrate my invention, I shall present two examples: In the first case, 37 shall designate a source of gamma rays such as $Co^{60}$ and the detector 39 will detect gamma rays scattered by the adjacent formations. In the second case, 37 shall designate a neutron source such as radium beryllium mixture and the detector 39 will detect the gamma rays resulting from the capture of neutrons by various elements that are present in the adjacent formations.

Consider now the first example based on the use of a source of gamma rays to irradiate the formations and of a detector of gamma rays to detect and measure the gamma rays scattered by the formations. In this embodiment the numeral 37 designates a $Co^{60}$ source which emits gamma rays of energy about 1.2 m.e.v. (More exactly, it emits two monochromatic rays having energies 1.17 m.e.v. and 1.33 m.e.v.) These gamma rays arrive at the detector either as a direct radiation or as a radiation that is scattered by the adjoining formations. It is apparent that direct radiation suffers no degradation of energy and the photons that are directly emitted by the source 37 and interact with the crystal 40 produced in the output of the photomultiplier 41 impulses having magnitudes corresponding to the energy of 1.2 m.e.v. On the other hand, those gamma rays that irradiate the adjoining formations suffer a degradation of energy since they undergo Compton scattering in which the scattered photon has only a portion of the energy of the incoming photon. Therefore, the electrons scattered by the formations interact with the crystal and since these electrons have an energy below 1.2 m.e.v. the corresponding impulses produced by the multiplier are smaller than the impulses due to the photons following the direct path from the source 37 to the crystal 40. The threshold network 43 connected to the output of photomultiplier 41 selectively transmits only those impulses that have magnitudes smaller than M where M designates the magnitude of impulses corresponding to an energy of 1.2 m.e.v.

The impulses having magnitudes smaller than M are transmitted by means of the cable 24 to the top of the drill hole, amplified in the amplifier 45 and applied to the rate measuring network 46. The voltage output of 46 is in turn applied to the recorder 31. Thus the variation of this voltage with the depth will be shown on the recorder 31 while the depth of the subsurface instrument in the hole will be indicated by means of the cable measuring device 23.

In the second embodiment of my invention I use a source of neutrons to irradiate the formations and a detector responsive to the gamma rays of capture emitted by said formations. Numeral 37 designates a radium beryllium preparation which may be enclosed in a container made of a suitable material such as glass. As it is well known, the radium beryllium mixture is not a pure source of neutrons since it emits a heterogeneous radiation comprising neutrons and gamma rays. The major portion of the emitted gamma rays are due to radium in equilibrium with its products and their energies are below the value of 2.5 m.e.v.

A portion of the beam of neutrons and gamma rays emitted by the source 37 travels directly from the source to the crystal 40 and the remaining portion interacts with the adjoining formation. The crystal 40 is composed of heavy elements such as calcium tungstate and, therefore, it does not respond to fast neutrons that arrive directly from the source. It responds, however, to gamma rays and since these gamma rays have energies below 2.5 m.e.v., the current pulses in the output of the photomultiplier having magnitude below a certain value N, said value N corresponding to energies of 2.5 m.e.v.

The gamma radiations emitted by the source 37 undergo numerous collisions in the adjoining formations and are partly scattered toward the detector. These scattered gamma rays have energies that are lower than the primary gamma rays emitted by the source 37. Consequently, the current impulses in the output of the photomultiplier 41 that are due to the scattered gamma rays are smaller than the above referred to value N.

The high energy neutrons emitted by the source 37 are slowed down to thermal velocities and then diffuse a distance which is determined by the abundance and capture cross sections of the elements present and eventually become absorbed by various elements. Upon the absorption of a thermal neutron, each element emits a gamma ray called gamma ray of capture and having an energy characterizing a given element. For instance, an atom of hydrogen by capturing a neutron emits a gamma ray of energy 2.2 m.e.v., an atom of nitrogen by capturing a neutron emits a gamma ray of energy 10.78 m.e.v., an atom of aluminum by capturing a neutron emits a gamma ray of energy 8 m.e.v.

It should be noted that hydrogen emits a gamma ray of capture having energy smaller than 2.5 m.e.v., and that all other elements emit gamma rays of capture having energies higher than 2.5 m.e.v. Thus the current impulses having magnitudes smaller than N correspond to neutron capture by hydrogen, and those having magnitudes larger than N correspond to capture by all remaining elements.

The threshold network 43 connected to the output of the photomultiplier 41 is adapted to transmit selectively only those impulses that exceed the value N and selectively attenuate the impulses smaller than N. The impulses exceeding the value N are transmitted by means of the cable 24 to the top of the drill hole, amplified in the amplifier 45 and applied to the rate measuring network 46. The voltage output of 46 is in turn applied to the recorder 31.

The threshold network 43 is used to perform the following functions: (1) To selectively attenuate and eliminate gamma rays that arrive directly from the source to the detector, i.e., to eliminate the shield customarily used to shield the source from the detector; and (2) to selectively attenuate and eliminate from the recording the gamma rays of capture due to hydrogen so as to produce a log representing the relative abundance of heavy elements; and (3) to selectively attenuate and to eliminate from the recording gamma rays that are emitted by the naturally radioactive elements present in the formation since these gamma rays have energies below 2.5 m.e.v. It is thus apparent that I have provided in my second embodiment a log representing the relative abundance of all elements heavier than hydrogen that are present in the formations surrounding the bore hole.

FIGS. 3a and 3b show the diagrams of the threshold network 43 to be used respectively in connection with the two embodiments of my invention. The threshold shown in FIG. 3a is adapted to transmit only those impulses that correspond to the gamma rays of energies less than 1.2 m.e.v. and is to be used in conjunction with a source 37 of gamma rays such as $Co^{60}$ emitting gamma rays of 1.2 m.e.v. As shown in FIG. 3a, one of the input terminals 42 is grounded and the other input terminal is connected to the primary windings 91 and 92 of a transformer 93, said windings being arranged in opposition. The ungrounded input terminal is connected to the winding 92 through a resistor 94 and to the winding 91 through a channel comprising a rectifier 95 in series with a battery 96. The secondary winding 97 of the transformer 93 is connected to the output terminals 44.

The voltage of the battery 96 is arranged to oppose the voltage across the input terminals 42. Thus, whenever a pulse exceeding a certain threshold value (corresponding to the energy of 1.2 m.e.v.) appears across the terminals 42 we obtain a current flowing through the rectifier 95 and the winding 91 to the ground terminals in the direction of the arrow A and another current simultaneously flow through the resistor 94 and the winding 92 to the ground in the direction of the arrow B. These two currents produce fluxes in the opposite directions in the primary of the transformer 93 and therefore no voltage appears across the output terminals 44.

On the other hand, whenever the pulse applied to the input terminals 42 is below said threshold value, the opposing voltage of the battery 96 exceeds the voltage provided by the pulse and therefore no current can flow through the rectifier 95 in the direction of the arrow A and the winding 91 is de-energized. However, a current flows through the resistor 94 and the winding 92 in the direction of the arrow B and this current induces a voltage across the output terminals 44 of the transformer 93. It is thus apparent that the network shown in FIG. 3A transmits only those impulses that are below a certain threshold value, said threshold value being determined by the battery 96.

The threshold network shown in FIG. 3b is adapted to transmit only those impulses that correspond to gamma rays of energies above 2.5 m.e.v. and is to be used in conjunction with a source 37 consisting of a neutron-beryllium mixture. As shown in FIG. 3b, the threshold channel comprises a battery 80 in series with a rectifier 81 and resistors 82 and 83 interposed between the input terminals 42. The output terminals 44 of the threshold network are applied to the resistor 82. The voltage of the battery 80 is so arranged as to oppose the voltage across the input terminals 42. If the voltage across the input terminals 42 is smaller than the opposing voltage of the battery there is no current in the circuit because of the unidirectional action of the rectifier 81. However, if the voltage impulses across the input terminals 42 exceed the voltage of the opposing battery 80 I obtain a current that is transmitted through the rectifier 81 and causes a corresponding voltage across the output terminals 44 of the resistor 82. The voltage of the battery 80 determines the threshold and thus only the voltage impulses exceeding the threshold appear across the output terminals 44. On the other hand, the voltage impulses at the input terminals 42 that are below the threshold are not transmitted because of the unidirectional conductivity of the rectifier 81.

Figures 5, 8:
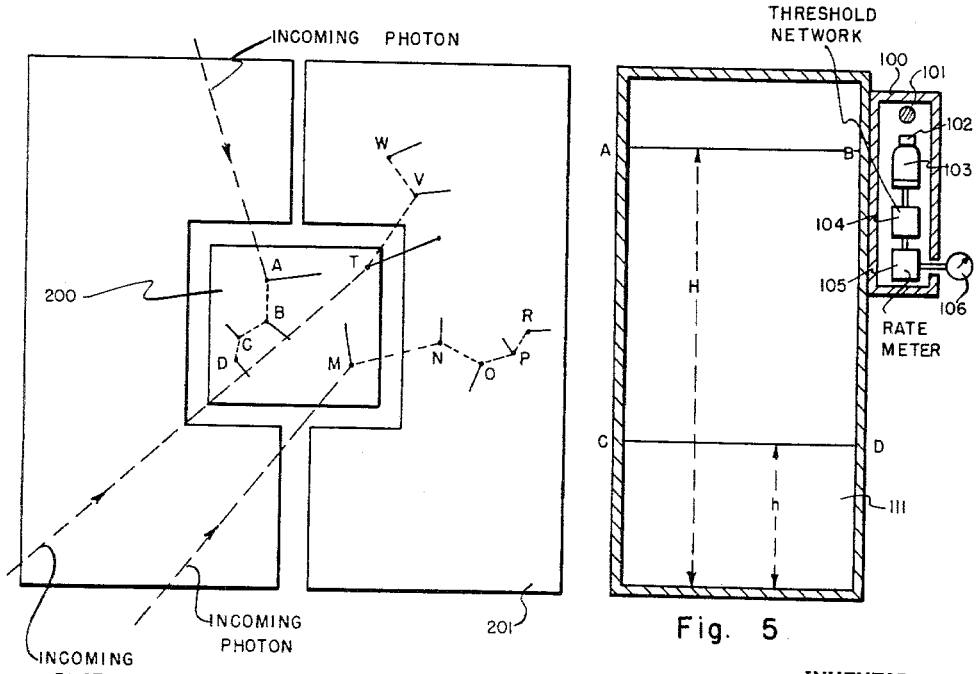
FIG. 5 shows the application of the principles of my invention for determining the level of a liquid in a tank.
FIG. 8 shows the photon tracks in a crystal assembly shown in FIG. 7.

FIGS. 4, 5, and 6 show some applications of my invention to non-destructive testing. The testing instrument shown in these figures is contained in a box or casing 100. Within the casing 100 a source 101 of gamma rays such as $Co^{60}$ is placed adjacently to a scintillation counter comprising a crystal 102 which scintillates when intercepted by gamma rays and actuates the photomultiplier 103. The crystal is of relatively large size so as to absorb completely the intercepted gamma rays and consequently, we obtain across the output terminals of the photomultiplier 103 a succession of impulses having magnitudes representing energies of the intercepted photons. Some of these photons arrive directly from the source 101 and have the energy of 1.2 m.e.v. The remaining photons that intercept the crystal 102 are scattered by the surrounding medium and have energies less than 1.2 m.e.v. The output impulses from the photomultiplier 103 are transmitted through a threshold network 104. The threshold network is of the type shown in FIG. 3a, i.e., it transmits only those impulses that correspond to energies less than 1.2 m.e.v. Thus the impulses transmitted by the network 104 correspond only to those photons that have been scattered by the surrounding medium. These impulses are in turn transmitted to a rate measuring network 105. The output of 105 is in turn applied to the indicator 106.

FIG. 4 shows the application of my invention to the determination of the thickness of a plate 110 from one side only without any necessity for obtaining access to the other side of the plate. Such a measurement can be used either inside or outside of steel tubing or other similar forms and can be rapidly and easily performed. The principle of this measurement is based on the well-known physical principle that radiation passing through matter will be scattered and the amount of radiation scattered will increase with the amount of matter traversed. Thus, the gamma rays from the source 101 are scattered by the plate 110 and the amount of scattered radiation is proportional to the material traversed, i.e., to the thickness of the sheet 110. Thus the indication of the meter 105 represents the thickness of the plate 110 and if the indication varies it will indicate corresponding variations in the thickness.

FIG. 5 represents the application of my method to the determination of the level of liquid in oil tanks. Let 111 designate an oil tank which is filled to the level CD with oil, said level being at a height H. It is desired to produce a signal whenever the oil reaches the level AB at a height H. This is accomplished by means of the instrument which is fastened to the outside wall of the tank at the level H as shown in FIG. 5. It is apparent that the meter 106 indicates radiations that are scattered not only by the wall of the tank adjacent to the instrument, but also rays that are scattered by the oil within the tank. If the liquid level is at a height H which is below the critical height H the scattering of the gamma rays takes place in the wall of the tank and in the air within the tank. Because of the low density of air, the scattering is relatively small and the meter 106 indicates a low reading. However, when the liquid level reaches the height H the amount of the scattered radiation as indicated by the meter 106 is considerably increased.

FIG. 6 shows the application of my invention to the determination of the density of a fluid passing through pipe 112. The measuring instrument is placed outside of the pipe and the radiaiton from source 101 is scattered by the wall of the pipe and by the fluid within the pipe. It is apparent that the amount of scattered radiation is higher for fluid of high density and consequently the indication of the meter 106 can serve to measure the density of the fluid within the pipe.

Figure 7:
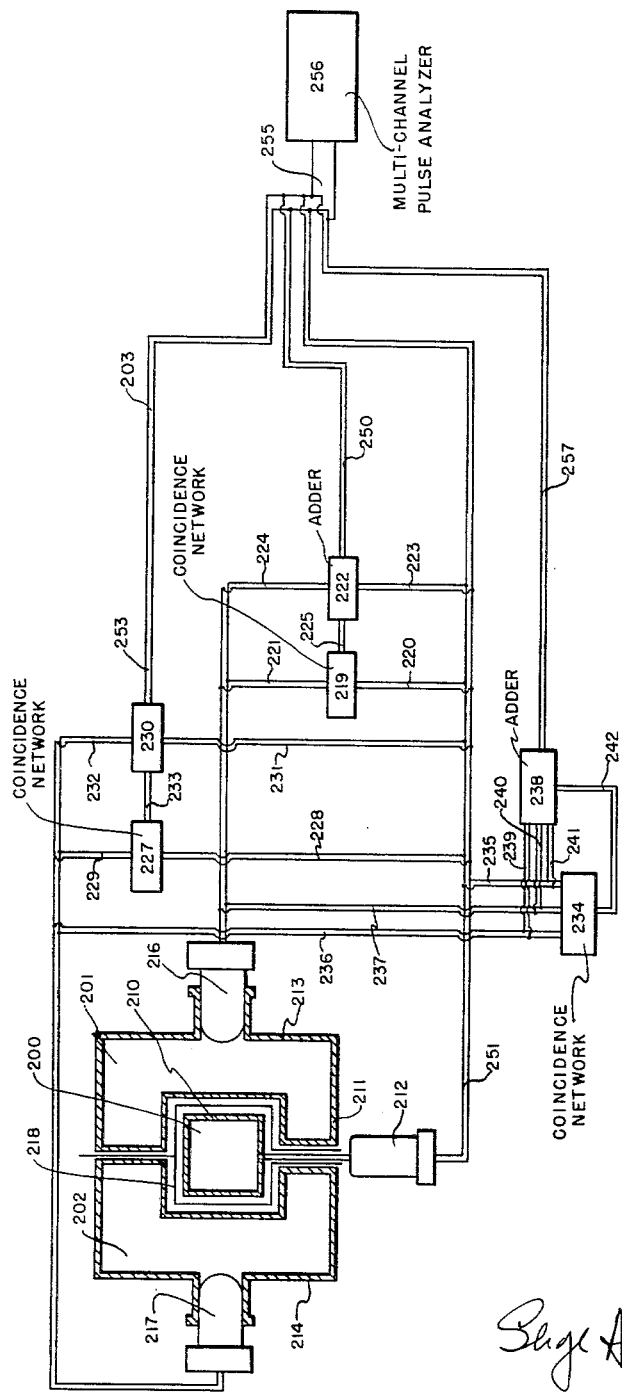
FIG. 7 shows the assembly of crystals to be used in connection with FIG. 2 to produce pulses having magnitudes proportional to the energy of incoming photons.

FIG. 7 shows an improved arrangement (that can be used instead of the arrangement 39 of FIG. 2) for detecting gamma rays and for producing current impulses having magnitudes proportional to the energy of the gamma rays. The detecting element in FIG. 7 consists of a plurality of crystals of which one is designated as the central crystal and is completely surrounded by the remaining crystals designated as peripheral crystals. The crystals may be sodium iodide or anthracene or of any other substance that is adapted to emit light under the effect of ionizing radiation. In FIG. 7, the central crystal 200 is almost completely surrounded by the peripheral crystals 201 and 202. The crystal 200 is surrounded by a reflector 210 that in combination with the light pipe 211 directs any light that is produced in this crystal 200 to the photomultiplier tube 212. Similarly, the crystals 201 and 202 are respectively surrounded by reflectors 213, 214 which direct light produced in said crystals to the photomultipliers 216 and 217, respectively. The crystals 200, 201, and 202 are optically insulated one from the other by means of an opaque partition 218 in such a manner that light produced in one of the crystals cannot be transmitted to any of the other crystals.

The output terminals of the photomultipliers 212 and 216 are applied to a coincidence network 219 by means of leads 220 and 221, respectively, and are also applied to an adder 222 by means of leads 223 and 224, said adder being actuated by the coincidence network 219 through leads 225. The adder 222 is adapted to produce across its output leads 250 an impulse which is equal to the sum of impulses derived from the photomultipliers 212, 216. Normally the adder 222 is inoperative and becomes actuated only when the impulses derived from the photomultiplier 212, 216 occur in coincidence.

The output terminals of the photomultipliers 212 and 217 are applied to a coincidence network 227 by means of leads 228 and 229, respectively, and are also applied to an adder 230 by means of leads 231 and 232, said adder being actuated by the coincidence network 227.

Similarly, the output terminals of all three photomultipliers 212, 216, and 217 are applied to a triple coincidence network 234 by means of leads 235, 236, and 237, respectively, and are also applied to an adder 238 by means of leads 239, 240, and 241, said adder being actuated by a coincidence network 234 through leads 242.

Consider now an incoming photon that interacts with the central crystal 200. Such an interaction may consist of a photoelectric effect, a Compton scattering, or a pair formation. Assume that the incoming photon has energy in the range between 0.5 m.e.v. and 2.5 m.e.v. In this energy range, the pair formation is negligible and therefore need not be considered. The photoelectric effect can also be neglected particularly if the crystal comprises elements of low atomic number (such as anthracene). Consequently, the only phenomenon to be accounted for is the Compton scattering. The Compton scattering is essentially a collision of the incoming photon with one of the orbital electrons, that is assumed to be free. As shown in FIG. 8, the first collision takes place at the point A and the path of the incoming photon arriving at the point A is indicated by a dashed line. As a result of this collision, a portion of the energy of the incoming photon is given to the electron and the remainder of the energy is carried off by the scattered photon. The path of the scattered photon leaving the point A is indicated by a dashed line whereas the path of the recoil electron leaving the point A is indicated by a solid line. The recoil electron has acquired a certain portion of the energy of the incoming photon and dissipates this energy by ionizing and exciting the atoms of the crystal. This energy is converted into a light pulse and the magnitude of this pulse is proportional to the energy of the recoil electron. Consequently, the light pulse produced in the crystal as a result of the first Compton scattering is not equal to the total energy of the incoming photon, but only to the portion of this energy that has been contributed to the ejected electron.

As stated above, as a result of the first collision, the incoming photon contributes to the ejected electron a portion of its energy and the remainder of the energy of the incoming photon is carried away by the scattered photon. Assume now that the second scattering occurs within the crystal 200 at a point B, i.e., the scattered photon collides with another electron within the crystal 200. The same process is repeated, i.e., a portion of the scattered photon is applied to the ejected electron and the remainder of the energy is carried by the scattered photon. The electron ejected at the point B produces a light flash the intensity of which is proportional to the energy of the electron ejected at B.

The photon undergoes successive collisions at points C, D, et. At each of these points it releases an electron that carries off a portion of its energy. The paths of the electrons ejected during these multiple collisions are designated by solid lines, and the paths of the scattered photons are designated by dashed lines. After such multiple collisions, the energy of the photon becomes considerably degraded, and for all practical purposes we may assume the energy of the original photon has been used up entirely to eject electrons at points A, B, C, etc., each of said electrons producing a light impulse the intensity of which is proportional to its energy. All these light impulses occur simultaneously and are transmitted through the light pipe 211 to the photosensitive surface of the photomultiplier 212 (as shown in FIG. 7). Thus the photomultiplier 212 receives a total light impulse that is proportional to the total energy of the incoming photon, and produces across its output terminals a current impulse having magnitude that is proportional to the energy of said incoming photon.

It is thus apparent that the crystal 200 in conjunction with the photomultiplier 212 produces pulses proportional to the energy of incoming photons. In order to establish such a proportionality it is necessary that the energy of the incoming photon be completely absorbed within the crystal. This can be accomplished by taking a relatively large crystal so that all the points such as A, B, C, etc. at which electrons are released during the multiple collisions, are contained within the crystal. On the other hand, however, by increasing the size of the crystal we decrease its transparency, and this in turn impairs the proportionality in the detector output.

Furthermore, even if we chose a very large crystal we will never have the assurance that each photon will lose all its energy within the crystal. A relatively common occurrence is illustrated in FIG. 8 in which the incoming photon interacts initially at a point M in the crystal 200 and ejects an electron to which it imparts a portion of its energy. However, the remainder of the energy is carried off by the scattered photon which escapes from the central crystal 200 and loses its energy in multiple collisions at points N, O, P, R within the adjoining crystal 201. Consequently, we obtain two simultaneous light pulses. One pulse occurs in the crystal 200 in the neighborhood of the point M and actuates the photomultiplier 212. The current impulse across the output terminals of the photomultiplier 212 represents, therefore, the portion of the photon energy that has been communicated to the Compton electron ejected at the point M. The other pulse occurs in the crystal 201. This other pulse consists of a superposition of pulses occurring simultaneously in the vicinity of points N, O, P, R. These pulses act on the photomultiplier 216 and produce a current impulse across its output terminals, said current impulse representing the sum of the energies of Compton electrons ejected at points N, O, P, R in the crystal 201. It is thus apparent that the sum of the impulses across the output terminals of the photomultipliers 212 and 216 represents the total energy of the incoming photon since it is equal to the sum of the energies transferred to Compton electrons at the points M, N, O, P, R.

Another situation may occur when the incoming photon undergoes its first collision at the point T in the crystal 200 and ejects a Compton electron which is only partly absorbed in the crystal 200. This electron leaves the crystal 200 and dissipates the rest of its energy in the crystal 201. The scattered photon emitted at the point T undergoes the second and third scattering at the points V and W and consequently it dissipates its energy in the crystal 201. Thus the sum of impulses across the output terminals of the photomultiplier 212 and 216 represents the total energy of the incoming photon.

Consider now again the diagram of FIG. 7. The incoming photons are intercepted by one or more crystals thus releasing Compton electrons. The Compton electrons produce light flashes thus causing current impulses to appear in the output of one or more photomultipliers. If the incoming photon is completely absorbed within the crystal 200 as shown in FIG. 8 a pulse appears across the output terminals of the photomultiplier 212, the magnitude of said pulse representing the energy of said photon. However, if the incoming photon undergoes only its first collision in the crystal 200 and the remaining collisions take place in the crystal 201, then two impulses appear simultaneously across the outputs of the photomultipliers 212 and 216. These impulses are applied to the coincidence network 219 and to the adder 222. The adder is normally inoperative and becomes operative only if actuated by the current from the output terminal of the coincidence network 219. Since the two impulses arrive in coincidence they actuate the coincidence network 219 which in turn actuates the adder 222, and consequently we obtain across the output terminals 250 of the adder the current representing the sum of these two impulses. Thus the current across the output terminals 250 represents the energy of the incoming photon.

It is thus apparent that whenever an incoming photon is completely absorbed by the crystal 200 we obtain across the terminals 251 of the photomultiplier 212 a current impulse having magnitude representing the energy of said photon. Whenever an incoming photon is partly absorbed in the crystal 200 and partly in the crystal 201 we obtain across the terminals 250 of the adder 222 a pulse having magnitude representing the energy of said photon. By means of arguments similar to those used above, it can be shown that whenever an incoming photon is partly absorbed in the crystal 200 and partly in the crystal 202 two current impulses appear in coincidence across the output terminals of the photomultipliers 212 and 217. These impulses actuate the coincidence network 227 which in turn actuates the adder 230, and we thus obtain across the output terminals 253 of the adder a current, the magnitude of which represents the energy of the incoming photon.

In some instances the incoming photon may undergo multiple collisions in crystals 200, 201, and 202, and therefore we obtain simultaneous pulses in each of these crystals and the total energy released by these three pulses represents the energy of the incoming photon. Under these conditions, the photomultipliers 212, 216, and 217 are simultaneously actuated. The outputs of these photomultipliers are applied to a triple coincidence network 234 through channels 235, 236, and 237, respectively, said network being provided with an output channel 242. Furthermore, the outputs of these photomultipliers are respectively applied to the adder 238 through the channel 235 in series with 241, the channel 236 in series with 239, and the channel 237 in series with 240, respectively. Consequently, whenever light pulses appear simultaneously in the crystals 200, 201, and 202, the coincidence network 234 produces a pulse across its output terminals 242, and this pulse in turn actuates the adder 238. We thus obtain across the output terminals 257 of the adder 238 a pulse having magnitude equal to the sum of the impulse applied to its input terminals 239, 240, and 241. It is apparent that the pulse produced by the adder represents the magnitude of the photon which interacted with the crystals 200, 201, and 202.

Each of the leads 250, 251, 253, and 257 is applied to the input terminals 255 of the multichannel pulse analyzer 256, which as adapted to separate the pulses in various groups in accordance with their magnitudes. For a description of a pulse height analyzer see, for instance, an article by C. W. Johnstone, A New Pulse-Analyzer Design, Nucleonics, January 1953, pp. 36–41 to U.S. Patent 2,642,527, issued to G. G. Kelley.

Consider now FIG. 9 representing a modified embodiment of a proportional gamma-ray counter. The portion of FIG. 9 comprising crystals 200, 201, 202 photomultipliers 212, 216, 217, and associated equipment is identical to the corresponding portion of FIG. 7. Those elements that are the same in FIG. 7 and FIG. 9 have been designated in both figures by the same numerals. Referring now more particularly to FIG. 9, the outputs of the photo-multipliers 212, 216 are applied to a coincidence network 300, said network having its output terminals connected by means of leads 301 to a controllable channel 302. Similarly, the outputs of photomultipliers 212, 217 are applied to a coincidence network 303, said network having its output terminals connected through leads 304 to said controllable channel 302.

The controllable channel 302 has its input terminals connected to the output of the photomultiplier 212 and has its output terminal connected to a multichannel pulse height analyzer 310. Under ordinary operating conditions the channel 302 is operative, i.e., a voltage applied to the input terminals 311 is transmitted to the output terminals 312. However, the channel is not operative whenever either of the coincidence network 300, 303 is energized.

It is apparent that some of the gamma rays intercepted by the crystal 200 are completely absorbed within said crystal, i.e., all the points of multiple scattering such as A, B, C, D in FIG. 8 are located within the crystal. In such case the light emitted by the crystal represents the total energy of the incident gamma ray. This light pulse actuates the photomultiplier 212 while the remaining photomultipliers 216 and 217 remain inactive. Therefore, the pulse appearing across the terminals of the photomultiplier 212 represents the energy of the incoming gamma ray, and whenever such a pulse appears there are no coincident pulses across the outputs of either of the photomultipliers 216 or 217. Consequently, neither of the coincidence networks 300 and 303 is energized and thus the pulse from the output of the photomultiplier 212 is transmitted through the channel 302 to the pulse height analyzer 310.

Consider now the gamma rays that are only partly absorbed within the crystal 200. An example of such an incident gamma ray is shown in FIG. 8 in which the gamma ray undergoes only one scattering at the point M in the crystal 200 since after the first scattering it escapes from the crystal 200 and undergoes all successive collisions at the points N, O, P, R in the crystal 201. Such a gamma ray releases only a portion of its energy within the crystal 200, and therefore the resulting pulse appearing in the output of the photomultiplier 212 is not indicative of the energy of the incident gamma ray. The purpose of this arrangement is therefore to eliminate from recording any incident gamma ray that is only partly absorbed in the crystal 200. Since the crystal 200 is entirely surrounded by the crystals 201 and 202 any photon which is only partly absorbed in the crystal 200 loses the rest of its energy in one of the adjoining crystals 201 or 202. This is illustrated in FIG. 8 in which the incoming photon following the trajectory M, N, O, P, R is partly absorbed in the crystal 200 and partly in 201. It is apparent that in such case two current impulses appear in coincidence across the ouput terminals of the photomultipliers 212 and 216. Consequently, the coincidence network 300 is actuated and a pulse appears across the leads 301. This pulse is applied to the controllable channel 302 and interrupts the connection between the leads 311 and 312. Thus no impulse is transmitted from the photomultiplier 212 to the multiple pulse height analyzer 310.

Similarly, whenever an incoming photon is only partly absorbed in the crystal 200 and loses the remainder of its energy in the crystal 202, we obtain coincident light pulses in the crystals 200 and 202 which in turn energize the photomultipliers 212 and 217 and the coincidence network 303. The coincidence network produces a pulse across its output leads 304 which in turn is applied to the controllable channel 302 and interrupts the connection between the leads 311 and 312. Thus no impulse is transmitted from the photomultiplier 212 to the multiple pulse height analyzer 310.

It is thus apparent that I have provided a scintillation counter that responds to those photons that are completely absorbed within the crystal 200 and does not respond to those photons that are only partly absorbed within the crystal 200.

It is apparent that I can apply the principles of my invention to a neutron counter by utilizing in the arrangements of FIG. 7 and FIG. 9 a crystal made of elements having a low atomic number such an anthracene. As is well known, a neutron interacting with a crystal undergoes a multiple collision somewhat similar to the one illustrated in FIG. 8. Therefore, it can be entirely absorbed in the crystal 200 or only partly absorbed in the crystal 200, the remainder of the neutron energy being absorbed in one of the adjoining crystals 201 or 202. Thus the diagram of FIG. 7 and FIG. 9 can be applied to neutron detection as well as to gamma ray detection. In considering the interaction of neutrons in matter, we should keep in mind that the multiple collisions such as illustrated in FIG. 8 are the collisions of a neutron with the proton, and as a result of each collision the proton acquires kinetic energy that is dissipated in ionization and excitation and produces a light impulse. Thus I have provided a scintillation counter that is adapted to produce current impulses representing the energies of incoming neutrons.

Figure 10A:
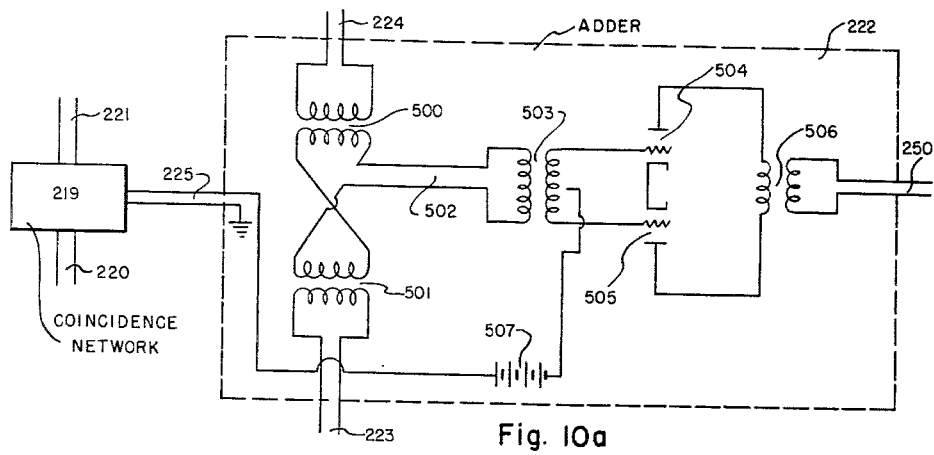
FIGS. 10a and 10b show diagrammatically a controllable adding network that is part of the arrangement of FIG. 7.

Consider now FIG. 10a showing diagrammatically an adder such as the one designated by the numeral 222 in FIG. 7, said adder being comprised in FIG. 10a within a dotted rectangle. The purpose of the adder is to produce across the output terminals 250 a voltage representing the sum of the input voltages applied across the leads 223 and 224. Furthermore, the adder should be effective only whenever a voltage appears across the control leads 225. The voltages applied across the leads 223, 224 are applied to the transformers 500 and 501. The secondary windings of these transformers are connected in series and therefore the voltage across the leads 502 is equal to the sum of the voltages across the input terminals 223 and 224. The voltage across the leads 502 is in turn applied to the primary winding of a transformer 503, the secondary winding of said transformer having its terminals connected to the grids of triodes 504 and 505. The triodes have their plates connected to the primary winding of a transformer 506, said transformer having its secondary winding connected to the output terminals 250. We have thus a push-pull amplifier which under normal operating conditions is biased to cut off by means of a battery 507. The control vlotage across the terminals 225 is arranged to oppose the biasing battery 507. Consequently no signal is transmitted from the channel 502 to the output channel 250 because of the biasing effect of the battery 507. However, whenever a voltage appears across the control terminals 225 the push-pull arrangement becomes effective to transmit the signal from the channel 502 to the output terminals 250 and we obtain thus across the output terminals 250 a voltage representing the sum of voltages applied across the output channels 224 and 223.

Figure 10B:
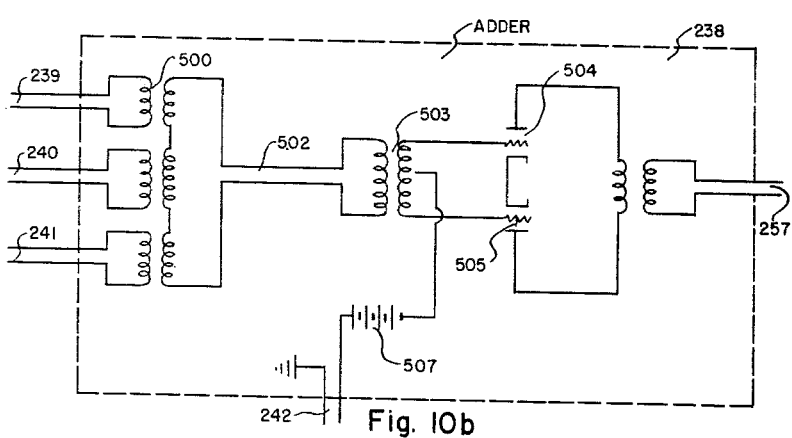

FIGURE 10b represents schematically the adder such as the one designated as 238 in FIG. 7. The operation of the adder 238 is identical to the adder 222 and it is self-explanatory since the elements that are the same in both adders have been designated by the same numerals in FIGS. 10a and 10b. The main difference between FIGS. 10a and 10b is that in FIG. 10b it is desired to add the impulses at the three input terminals, 239, 249, and 241, whereas in FIG. 10a it is desired to add impulses across the two input terminals 224 and 223. In FIG. 10a the voltage representing the sum of the three input impulses appears across the output terminals 257 of the adder, and is operative only whenever a control voltage appears at the terminals 242.

Figure 11:
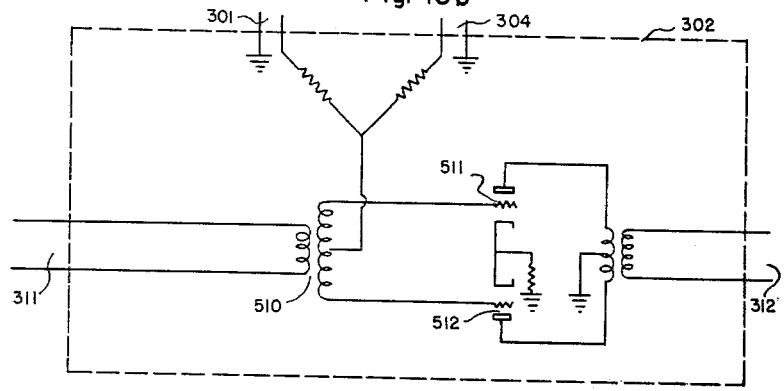
FIG. 11 shows diagrammatically a controllable channel that is part of the arrangement of FIG. 9.

FIG. 11 represents diagrammatically the controllable channel such as designated as 302 in FIG. 9, said channel being provided with input terminals 311, output terminals 312, and control terminals 301 and 304. Under normal operating conditions a voltage applied to the input terminals 311 appears across the output terminals 312 and the connection between the input channel and the output channel is interrupted only if a voltage appears at either of the control channels 301, 304. As shown in the figure, the input terminals 311 are connected to the primary winding of the transformer 510 and the secondary winding of the transformer 510 is connected to the grids of the triodes 511 and 512 arranged in push-pull.

Under normal operating conditions, in the absence of voltage at either of the control terminals 301, 304, the voltage applied to the input terminals 311 is transmitted through the transformer 510 and the push-pull circuit to the output terminals 312. However, whenever a control voltage appears at either of the terminals 301, 304, it biases the amplifiers 511, 512 to the cut off, and therefore the push-pull circuit disconnects the input leads 311 from the output leads 312.

Consider now FIG. 12 showing an application of the principles of my invention to the "anticipatory logging system." Such a system provides the driller or operator with information concerning the approach of the bit or the end face of the bore hole toward the change in the earth formation through which the drilling is proceeding. The information provided by such arrangements is obviously of great value to the driller, comprising, as it were, an advance notice of the type of formation to be drilled into.

To provide an indication of the characteristics of a formation as yet undrilled and situated beyond the face of the bore hole two systems can be used designated as A and B. In the system A, a source of gamma rays is constrained or induced to send directionally a beam of radiation downward toward the regions situated below the drill at a considerable distance from the bore hole, and a detector adjacent to said source is adapted to receive radiations scattered and returned from said region. In the system B, a source of neutrons placed above the drill bit transmits neutrons in all directions. In the immediate neighborhood of said source is placed a directional radiation detector, adapted to detect only those gamma rays of capture that are returned from the formations below the bit and are directed upward toward the detector.

Referring now to the FIG. 12, there is illustrated a typical earth bore 350 being drilled through successive earth strata by means including a drill bit 351 secured to the lower end of a drill collar 352 which forms the lower section of a drill string 353 comprising one or more sections of a drill pipe, and a kelly. The kelly and the drill string are suspended from a rotary swivel carried by the traveling block. The kelly, a rotary swivel, and traveling block are not shown in the figure. The drill step is lined with an insulating liner 354 which extends below the bottom limit of the drill stem and engages the metal bit. This liner serves as a bushing to insulate the mud from the drill stem.

A conducting liner consisting of a metallic tube 355 passes the entire length of the drill stem inside of the insulating liner 354 and makes an electrical connection between the detecting equipment at the subsurface and the earth's surface. At the lower end of the drill collar directly above the bit 351 is positioned a source of radiation 360 and a detecting and signalling means 361 responsive to the radiation emited by the subsurface.

Consider now the system A and let numeral 360 represent a suitable source of gamma rays such as $Co^{60}$ or radium. This source is placed in a block 362 of material such as lead or tungsten which will strongly absorb the emitted rays, so that practically the only radiation from 360 which appears outside the block is the narrow pencil of parallel rays which pass in the downward direction through the hole 363. This collimated beam penetrates into the formation below the drill bit and interacts with the matter at various depths such as $H_1$, $H_2$, $H_3$ shown in the figure. As a result of such interaction some of the photons are absorbed due to the photoelectric effect and other undergo Compton scattering and in the latter case a portion of the scattered photons is directed upward in the direction of the arrow Z and is intercepted by the detector 365. The detector 365 is directional, i.e., it is adapted to receive only those radiations that are directed upward in the direction of the arrow Z and it is not responsive to radiations arriving from other directions.

The detector is a proportional gamma rays counter, i.e., it produces across its output terminals impulses that are proportional to the energies of the intercepted photons. The output of the detector is connected to gate networks 366, 367, and 368. The gate 366 is arranged to transmit impulses corresponding to photons having energies below 0.5 m.e.v., the gate 367 transmits impulses having energies from 0.5 m.e.v. to 1.5 m.e.v. and the gate transmits impulses having energies from 1.5 m.e.v. to 2.4 m.e.v. It is well known that total cross section for capture and scattering is higher for low energy photons than for high energy photons, and therefore a beam of low energy photons is more effectively attenuated than a beam of high energy photons when passing through various layers of earth. Consequently the spectral distribution of gamma rays arriving at the detector can be correlated with the depths at which these gamma rays originated. Thus the hard gamma rays produce impulses transmitted through the gate 368 and these gamma rays originate at larger depths such as $H_3$ shown in FIG. 12. The medium and soft gamma rays produce impulses in the output of the gates 367 and 366, respectively, and originate at shallower depths $H_2$ and $H_1$. The values $H_1$, $H_2$, $H_3$ do not represent definite magnitudes of depths, but represent ranges of depths that are in the neighborhood of values $H_1$, $H_2$, and $H_3$.

The outputs of the gates 366, 367, 368 are applied to rate meters 376, 377, 378, respectively, and thus we obtain across the output terminals of these rate meters D.-C. voltages representing the characteristics of the earth formation at the depths $H_1$, $H_2$, and $H_3$, respectively. Thus these voltages can be used as an index of the properties of the formations as yet undrilled and situated below the face of the bore hole.

The voltages derived from the rate meters 376, 377, 378 are arranged to modulate the amplitudes of oscilators 386, 387, 388, each of said oscillators having its own characteristic frequency. These modulated outputs are in turn applied to the metallic conductor 355 and are transmitted to the earth's surface. At the earth surface they are applied to the demodulators 396, 397, 398 which reproduce at their output terminals the original modulating voltages obtained in the subsurface at the outputs of the rate meters 376, 377, and 378, respectively. The outputs of the demodulators 396, 397, and 398 are indicated on the meters 406, 407, and 408. It is apparent that these meters represent chracterics of the formations at the depths $H_1$, $H_2$, and $H_3$, respectively.

Consider now the system B and refer again to FIG. 12. Now the numeral 360 designates a source of neutrons such as radium beryllium mixture. These neutrons are slowed down by thesurrounding formations until they reach thermal energies and are eventually captured by various elements, and each neutron capture is accompanied by the emission of a photon. In the immediate neighborhood of the neutron source 360 is placed a directional gamma ray detector 365 which produces across the output terminals pulses representing the energies of gamma rays intercepted by the detector. These gamma rays are produced as a result of interaction of neutrons with the underlying formations at various depths underneath the drill and emitted upward in the direction of the arrow Z. These gamma rays undergo multiple collisions in the formations and are intercepted by the detector 365. The output of the detector 365 is transmitted to the gate network 366, 367, 368. The gate 366 transmits impulses corresponding to gamma rays of intermediate energy, and gate 368 transmits impulses corresponding to hard gamma rays. The hard gamma rays detected at the output of the gate 368 originate at the greatest maximum depth designated as $H_4$ underneath the drill. The intermediate gamma rays at the output of the gate 367 originate at the maximum depth $H_3$, and the softest gamma rays detected at the output of 366 originate below the maximum depth $H_2$. The outputs of the gate networks are applied to the rate metering networks 376, 377, 378 and the D.C. voltage from the outputs of the rate metering network are arranged to modulate the amplitudes of oscillators 386, 387, 388, each of said oscillators having its own characteristic frequency. These modulated outputs are in turn applied to the metallic conductor 355 and are transmitted to the earth's surface. At the earth's surface they are applied to the demodulators 396, 397, 398 which operate in the same manner as disclosed hereinabove and given on the meters 406, 407, and 408 indication of the characteristics of the formation within at the depths $H_2$, $H_3$, and $H_4$, respectively. Thus the driller is continually informed during the drilling process regarding the character of the formation positioned underneath drill.

It is also apparent that one of the gate networks such as, for instance, the network 366 may be adapted to selectively transmit the impulses representing the energy of 2.3 m.e.v. corresponding to gamma rays of capture by hydrogen. In such case the output of the rate meter 376 will represent the presence of hydrogenous formation underneath the drill bit.

The directional gamma-ray detector designated in FIG. 12 by the numeral 365 may be either of the type shown in FIG. 13 or FIG. 14. In FIG. 13 the directional detector consists essentially of a crystal 430 in conjunction with the photomultiplier 431 and a lead shield 432. The crystal may be of anthracene, sodium iodide, or by any substance adapted to produce light as a result of interaction with photons. The shield 432 is of a material such as lead or tungsten which will strongly absorb all incident photons except those arriving along the direction LK designated as the axis of the directional receiver. Thus, if the radiations arrive along the direction of the axis, they are intercepted by the directional receiver. The crystal is sufficiently large so as to absorb all the energy of incoming photons and thus we obtain across the output terminals 434 of the photomultiplier 431 a succession of impulses having magnitudes representing the energies of corresponding photons.

The directional receiver shown in FIG. 14 consists of a plurality of crystals aligned along the direction of the axis LK and is responsive only to those incident photons that cause coincident counts in all these crystals. I have illustrated two crystals 450 and 451 aligned along the axis LK, said crystals cooperating with photomultipliers 452 and 453, respectively. The photomultiplier 452 has its output connected to a coincidence network 455 through leads 456, 457 and the output of the photomultiplier 453 is connected to the coincidence network 455 through leads 458, 459. It is apparent that various incident photons undergo Compton scattering in the crystal 451 and induce a pulse in the output of the photomultiplier 453. However, those impulses that arrive from the downward direction along the axis LK undergo a first scattering in the crystal 451, and subsequently the scattered photon undergoes a second scattering in the crystal 450. Consequently, whenever a photon arrives along the direction LK we obtain two coincident impulses that actuate the coincidence network 455 and produce a signal across the output leads 460 of the coincidence network. As explained above, the intensity of the pulse in the crystal 451 and, consequently, the magnitude of the current pulse in the output of the photomultiplier 451, represents the energy lost by the photon during the first scattering. Similarly, the magnitude of the pulse in the output of the photomultiplier 452 represents the remainder of the photon energy, which, as we assume, has been lost during the second scattering in the crystal 451. Thus the sum of these two pulses represent the total energy of the incident photon. The output of the photomultiplier 452 is applied to the adder 470 through leads 456 and 471. Similarly, the output of the photomultiplier 453 is connected to the adder 470 through the leads 458 and 472. The adder is provided with output leads 473 and a pair of control leads 460. The adder is normally inoperative but whenever current impulse appears at its control leads 460, we obtain across the output leads 473 an impulse having magnitude representing the sum of impulses applied to the leads 471 and 472, respectively. Consequently, we obtain across the output terminals 473 a succession of pulses having magnitudes representing energies of the incoming photons.

Figure 15:
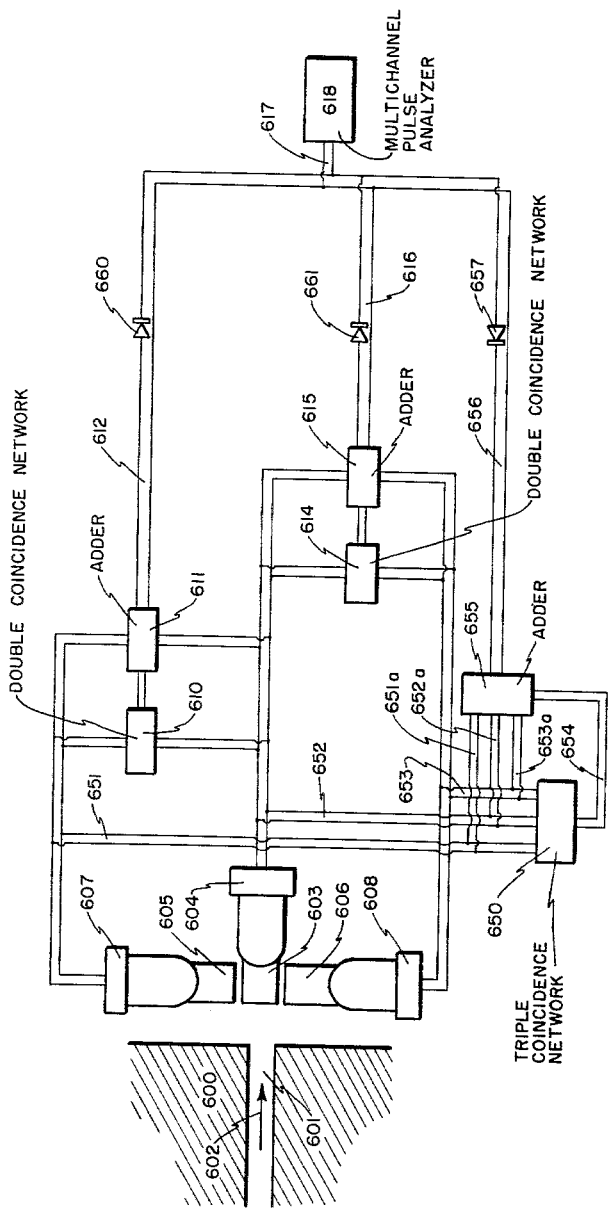
FIG. 15 shows an assembly of crystals to be used in coincidence in which the electric pulses are related in the same manner to the energies of photons that undergo Compton effect and pair formation.

Consider now the embodiment of FIG. 15 in which the incident photon flux is collimated by means of a shield 600 provided with a tubular opening 601 allowing a narrow beam of incident photons to arrive along the direction of an arrow 602. These photons interact with the crystal 603 associated with the photomultiplier 604. As a result of one type of interaction designated as Compton effect, a portion of the energy of the incident photon is absorbed in the crystal 603 and the remaining portion escapes in the form of a scatterd photon. The crystal 603 is placed adjacently to two crystals 605 and 606, above and below the crystal 603, substantially as shown in FIG. 15. The crystal 605 cooperates with the photomultiplier 607 and the crystal 606 cooperates with the photomultiplier 608.

It is apparent that a photon that is scattered by the central crystal 603 in a direction substantially perpendicular to the original direction of incidence shown by arrow 601 interacts either with the crystal 605 or with the crystal 606. For such cases the scattering angle $\theta$ is approximately 90°. It is well known that if the scattering angle $\theta$ is equal to or is larger than 90°, then the energy of the scattered photon is always equal to or smaller than 0.5 m.e.v. even if the energy of the primary incident photon is very large. Accordingly, the thickness of each of the crystals 605, 606 is arranged to be equal to the mean free path of a photon having energy of 0.5 m.e.v. In such a manner a scattered photon passing through either of the crystals 605 or 606 has a substantial probability of undergoing a complete absorption in said crystals.

It is apparent that whenever an incoming photon is partly absorbed in the crystal 603 and partly in the crystal 605, two current impulses appear in coincidence across the output terminals of the photomultipliers 604 and 607. These photomultipliers acuate the coincidence network 610 which in turn actuates the adder 611, and we thus obtain across the output terminals 612 of the adder a pulse the magnitude of which represents the energy of the incoming photon.

Similarly, whenever an incoming photon is partly absorbed in the crystal 603 and partly in the crystal 606 two current impulses appear in coincidence across the output terminals of the photomultipliers 604 and 608. These photomultipliers actuate the coincidence circuit 614 which in turn actuates the adder 615 and thus obtains across the output terminals 616 of the adder a pulse, the magnitude of which represents the energy of the incoming photon. The adder 611 and the adder 615 is of the type illustrated diagrammatically in FIG. 10a.

The output channel 612 of the adder 611 and the output channel 616 of the adder 615, are respectively connected through the rectifiers 660 and 661 to the input leads 617 of a multichannel pulse analyzer 618 which is adapted to separate pulses in accordance with their magnitudes and to produce a record representing the spectral distribution of said impulses.

It is apparent that the incident photon does not always undergo the Compton interaction in the crystal 503, since a pair formation often occurs. According to the process of pair formation a high energy photon (having energy in excess of 1.02 m.e.v.) gives rise to the creation of a pair of electrons. One of these electrons is of the ordinary type and has a negative charge, but the other designated as positron is a particle equal in mass to the negative electron, but bearing a positive charge. In the process of pair production, all of the photon energy is used up and goes into forming the electron pair and into imparting kinetic energy to the pair thus formed. Thus, both the electron and positron take up 0.51 m.e.v each from the incident photon. Any addition of energy possessed by the photon over and above 1.02 m.e.v. which is the minimum required for this pair creation, goes into imparting kinetic energy to the pair.

Assume that a pair production that took place in the crystal 603 was due to a photon having energy 3 m.e.v. Of this energy 1.02 m.e.v. has been used up to "materialize" the electron and positron and the remainedr, i.e., 1.98 m.e.v., was used up to impart kinetic energy both to the electron and positron. Thus kinetic energy is converted into light impulses in a manner well known in the art, and this impulse produces in turn a voltage impulse across the output terminals of the photomultiplier 604. Consequently, the larger is the energy of the pair producing photon the larger is the impulse in the output of the photomultiplier 604.

Both the electron and the positron produced in the crystal 603 as a result of pair production lose their energy by ionizing and exciting the atoms of the crystal until they are slowed down. After the positron has been reduced in energy it makes a unique and final interaction with an orbital electron. In this interaction the pair of positive and negative electrons unite and annihilate themselves in the formation of two photons that are ejected in opposite directions. These photons designated as annihilation quanta interact simultaneously with the crystals 605 and 606.

It is thus aparent that in case of the occurrence of a pair formation due to an incident photon of an energy 3 m.e.v. we have a pulse in the crystal 603, the magnitude of said pulse representing the energy of 1.98 m.e.v., and two simultaneous pulses in the crystals 605, 606, each of said simultaneous pulses having a magnitude corresponding to the energy 0.51 m.e.v. Thus we obtain two simultaneous pulses across the terminals of the adders 611 and 615, respectively. The pulse across the output terminals of the adder 611 represents the value 2.49 m.e.v., i.e., sum of energies absorbed in the crystals 603 and 605, and similarly, the pulse across the output terminals of the adder 615 represents the same value, i.e., the sum of energies absorbed in the crystals 603 and 606. It is aparent that each of these two pulses represents the value 2.49 m.e.v., said value being lower by 0.51 m.e.v. than the actual value of the incident photon. Thus, in case of a triple coincidence, the pulses appearing across the output leads of the adders 611 and 615 are related to the energy of the incident photons in a different manner than those photons that undergo Compton effect. The pulses associated with triple coincidences should therefore be interpreted differently than the pulses due to double coincidences.

In order to provide a uniformity in interpretation of the pulse magnitudes, irrespective as to whether these pulses are due to Compton effect or pair formation, I provide an auxiliary arrangement including triple coincidence network 650. It is noted that in case of the occurrence of pair formation we obtain simultaneous pulses in crystals 603, 605, and 606, and the total energy of these pulses represents the energy of the incoming photon. Under these conditions, the photomultipliers 604, 607, and 608 are simultaneously actuated. The outputs of these photomultipliers are applied to a triple coincidence network 650 through channels 651, 652, and 653, respectively, said network being provided with an output channel 654. Furthermore, the outputs of these photomultipliers are respectively applied to the adder 655 through the channels 651, 651a; 652, 652a; 653, 653a, respectively. Consequently, whenever pulses of light appear simultaneously in the crystals 603, 605, and 606, the coincidence network 650 produces a pulse across its output leads 654 and this pulse in turn actuates the adder 655. We thus obtain across the output terminals 656 of the adder 655 a pulse having magnitude equal to the sum of the impulses applied to the input terminals 651a, 652a, and 653a. It is apparent that the pulse produced by the adder 655 represents the magnitude of the photon that underwent pair formation. The output leads 656 of the adder are connected through the rectifier 657 to the input leads of the multichannel pulse analyzer 618. The adder 655 is of the type illustrated diagrammatically in FIG. 10b.

It is noted that the adders 611, 615, and 655 are connected to the input leads 617 of the multichannel pulse analyzer 618 through the rectifiers 660, 661, 657, respectively. Thus, if three unequal impulses are simultaneously generated across the output leads of the adders 611, 615, and 655, only this impulse that is larger than the other two impulses is transmitted to the input leads 617 of the analyzer 618. It is apparent that during the occurrence of a triple coincidence we obtain three coincident pulses across the terminals of the adders 611, 615, and 655, respectively. The impulse generated across the output terminals of the adder 655, being the largest, is the only one that is transmitted through the leads 617 to the pulse analyzer 618. Because of the action of the rectifiers the voltages obtained simultaneously from the adders 611, 615 that are smaller in magnitude are not transmitted to the input leads 617.

Figure 16:
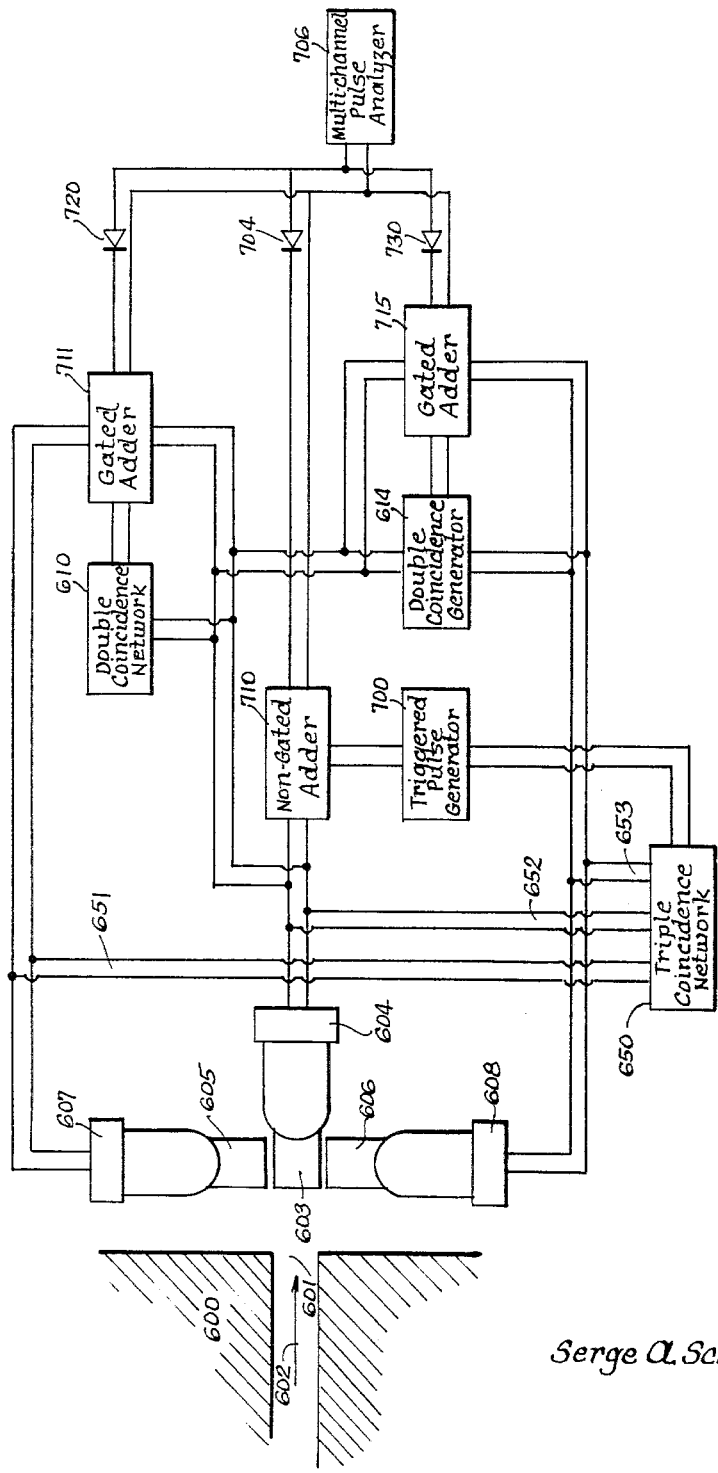
FIG. 16 shows an alternate arrangement serving the same purpose as the arrangement of FIG. 15 in which, however, the triple coincidence network actuates a triggered pulse generator rather than an adder.

FIG. 16 shows another embodiment of my invention wherein provision is made for accurately measuring and recording the energies of detected gamma rays, whether the interactions of such rays in the detector be Compton reactions or pair formations.

In FIG. 16, certain of the components are similar to those heretofore described with reference to FIG. 15, and in some cases such components have been designated by the same reference numerals used in FIG. 15. Thus, as in FIG. 15, the FIG. 16 apparatus comprises a shield 600 having a narrow opening 601 which permits a collimated beam of incident photons to impinge on the apparatus along the direction of the arrow 602.

Also as in FIG. 15, the apparatus comprises a main scintillating phosphor 603 and having an associated photomultiplier 604. Phosphor 603 is flanked by a pair of phosphors 605 and 606, the sizes of which are adjusted in accordance with the principles heretofore described with reference to FIG. 15. Each of the phosphors 605 and 606 has associated with it a photomultiplier, respectively designated 607 and 608.

In the FIG. 16 apparatus, I provide a triple coincidence network 650, similar to the corresponding element of FIG. 15, and, as in that figure, the three inputs of the triple coincidence network 650 are connected respectively to the outputs of photomultipliers 604, 607, and 608.

Again as in FIG. 15, a double coincidence network 610 has its respective inputs fed by photomultipliers 604 and 607, and its control or output terminals are connected so as to govern the operation of a gated adder 711, corresponding to element 611 of FIG. 15. The two inputs of the adder 711 are respectively fed by photomultipliers 604 and 607, and the output of adder 711 is connected through rectifier 720 to a multichannel pulse analyzer 706, corresponding to element 618 of FIG. 15.

Another double coincidence network 614 has its input channels respectively fed by impulses from photomultipliers 604 and 608, and its control or output terminals are connected to govern the operation of a gated adder 715, similar in structure and function to the adder 615 of FIG. 15. The output terminals of adder 715 are connected through rectifier 730 to the pulse analyzer 706.

The output of photomultiplier 604 is also fed into one of the two inputs of a non-gated adder 710. Element 710 is broadly similar to the adders heretofore described in this specification except that it is always operative to pass a signal from either of its input terminals to its output terminal, regardless of whether a control voltage is provided. In other words, the non-gated adder 710 may be generally like the adder heretofore described and diagrammatically illustrated in FIG. 10a, except that the control terminals 225 are eliminated, the biasing battery 507 is returned directly to ground, i.e., the cathodes of tubes 504 and 505, and the voltage of battery 507 is adjusted to provide a normal operating bias for the tubes 504 and 505 rather than a cut-off bias as in the FIG. 10a arrangement. Non-gated adders of the type indicated by element 710 are well known in the art in other applications.

The output terminals of adder 710 are fed through rectifier 704 to the input of pulse analyzer 706, and the second pair of input terminals of the adder 710 are fed by pulses from a triggered pulse generator 700. Pulse generator 700 may be any of the conventional and well-known devices by means of which an electric impulse of predetermined magnitude and duration is generated in response to a triggering impulse. Devices of this kind are widely known in the art and include the devices commonly called univibrators, one-shot multivibrators, triggered blocking oscillators, etc.

The triggered pulse generator 700 is controlled by output pulses from the triple coincidence network 650, heretofore referred to.

Triggered pulse generator 700 is so adjusted as to produce, in response to triggering impulses from network 650, output impulses having magnitude and duration equivalent to the pulses from photomultiplier 604 that are generated at the output thereof responsively to detection of 1.02 m.e.v. gamma rays by phosphor 603. In other words, the pulse generator 700 is so adjusted as to produce, when triggered, an output pulse that simulates the pulses from photomultiplier 604 representing 1.02 m.e.v. of ray energy.

Now, in describing the operation of FIG. 16, let us bear in mind that some of the interactions taking place in phosphor 603 will be of the Compton type and others will be pair formations. The object of the apparatus is to provide output pulses which can be analyzed by the pulse analyzer 706 with accurate results, regardless of which type of interaction occurred to produce the pulses.

This objective is obtained in the following way: When a Compton interaction takes place, the probability is great that the light flash representing the interaction in phosphor 603 will be simultaneously accompanied by a flash in one or the other of phosphors 605 or 606. If this occurs, one or the other double coincidence networks 610 or 614 will be actuated, its corresponding gated adder 711 or 715 will become conductive, and an output impulse will reach the pulse analyzer 706, the magnitude of such impulse being proportional to the total ray energy, i.e., the sum of the energy given up in phosphor 603 and that given up in whichever one of the flanking phosphors received the scattered ray.

When the interaction of the gamma ray in the phosphor 603 is of the pair-formation type, there is a high probability that the electron and positron created thereby will produce simultaneous flashes in both of the phosphors 605 and 606 to accompany the main flash in phosphor 603 that marks the occurrence of the pair formation. As previously explained with reference to FIG. 15, the magnitude of the flash that results from the main interaction in phosphor 603, and hence of the corresponding electric impulse produced by photomultiplier 604, represents the original energy of the gamma ray less 1.02 m.e.v., which is the energy required to "materialize" the electron and positron.

When such an event occurs in the apparatus of FIG. 16, the simultaneous occurrence of flashes in all three phosphors actuates the triple coincidence network 650 and produces therefrom an output impulse that triggers the pulse generator 700. Generator 700, in response to the triggering impulse from network 650, feeds into the adder 710 an output impulse that simulates an impulse representative of 1.02 m.e.v. of energy. This impulse is added by element 710 to the impulse derived from photomultiplier 604, and the resulting output signal is an impulse having a magnitude proportional to the original energy of the gamma ray, the 1.02 m.e.v. of energy lost by pair formation having been in effect "restored" by the apparatus. This output signal is fed through the rectifier 704 to the multichannel pulse analyzer 706. At the same time that this occurs, weaker impulses will reach the respective rectifiers 720 and 730 from the adders 711 and 715, but they will not be transmitted to the pulse analyzer 706 because the rectifiers 720 and 730 will be polarized in a non-conducting condition by reason of the presence of the larger pulse from adder 710.

In other words, the larger pulse is transmitted and the smaller pulses are suppressed, just as with the FIG. 15 apparatus.

From the above description of the operation of FIG. 16, skilled readers will realize that the FIG. 16 embodiment of my invention will provide faithful analysis, by energy level, of a detected stream of gamma rays, without introduction of error by reason of the fact that some of the ray interactions with the detecting phosphor are of the Compton type and others are of the pair-formation type.

I claim:

1. Radiation detecting means for detecting gamma rays incident from a determined and known direction, said means comprising a first radiation sensitive element adapted to interact with said gamma rays and to produce an electric impulse having magnitude representing the energy absorbed in said element as a result of said interaction, a second radiation sensitive element, a shield interposed between said second element and incident radiation, said second element being so positioned as to respond only to the gamma rays scattered by said first element in directions substantially perpendicular to said incident radiation, the interaction of said second element with said scattered ray producing an electric pulse having magnitude representing the energy absorbed in said element as a result of said interaction, a time selective means fed by impulses derived from said two elements operative to produce a resultant impulse only in response to reception from both of said elements of electrical impulses, said resultant impulse having magnitude proportional to the sums of magnitudes of such coincidentally occurring impulses.

2. Radiation detecting means for detecting gamma rays incident from a determined and known direction, said means comprising a first radiation sensitive element adapted to interact with said gamma rays and to produce an electric impulse having magnitude representing the energy absorbed in said element as a result of said interaction, two other radiation sensitive elements positioned on the opposite sides of said first element, a shield interposed between said two elements and incident radiation, said two other elements being so positioned as to respond only to the gamma rays emitted from said first element in directions substantially perpendicular to said incident radiation, the interaction of said two other elements with said scattered ray producing an electric pulse having magnitude representing the energy absorbed in said element as a result of said interaction, means for adding the pulse obtained from said first element with a pulse obtained from one of said other elements, whenever said pulses occur in coincidence, another means for adding the pulses obtained from all said three elements, whenever said pulses occur in coincidence, and means for separating the outputs of said last two means.

3. The apparatus defined in claim 2 in which said last separating means is adapted to transmit the larger of the outputs of said adding means.

4. The apparatus defined in claim 2 comprising also means fed by the last-mentioned means of claim 2 for indicating the respective magnitudes of the outputs transmitted by said last-mentioned means.

5. Radiation detecting means for detecting gamma rays incident from a determined and known direction, said means comprising a first radiation sensitive element adapted to interact with said gamma rays and to produce an electric impulse having magnitude representing the energy absorbed in said element as a result of said interaction, two other radiation sensitive elements positioned on opposite sides of said first elements, a shield interposed between said two other elements and incident radiation, said two other elements being positioned so as to respond only to the gamma rays scattered by said first element in directions substantially perpendicular to said incident radiation and, furthermore, to provide a substantial probability that a pair formation interaction in said first element will be accompanied by the escape of annihilation photons that will interact simultaneously with said two other elements, the interaction of said two other elements with said scattered ray producing an electric pulse having magnitude representing the energy absorbed in said element as a result of said interaction, a time selective means fed by impulses derived from said first element and one of said two other elements in order to produce a resultant impulse only in response to reception from both of said elements of electrical impulses, said resultant impulse having magnitude proportional to the sums of magnitudes of such coincidentally occurring impulses, another time selective means fed by impulses derived from said first element and from both of said other two elements operative to produce output impulses only in response to reception of electrical impulses in substantial time coincidence from all three of said elements, each of said output impulses representing detection of a gamma ray which has undergone a pair-formation interaction in said first element, and means for separating the outputs of said two time selective means.

References Cited by the Examiner

UNITED STATES PATENTS

| | | | |
|---|---|---|---|
| 2,830,185 | 4/1958 | Scherbatskoy | 250—71.5 |
| 2,881,324 | 4/1959 | Scherbatskoy | 250—71.5 |
| 2,946,888 | 7/1960 | Scherbatskoy | 250—71.5 |

RALPH G. NILSON, *Primary Examiner.*

ARCHIE BORCHELT, *Examiner.*